(12) United States Patent
Gerbetz (10) Patent No.: US 11,581,762 B2
(45) Date of Patent: Feb. 14, 2023

(54) CLAW POLE MOTOR WITH A RING COIL AND A MEANDERING COIL

(71) Applicant: Moog Inc., East Aurora, NY (US)

(72) Inventor: Robert P. Gerbetz, Waukegan, IL (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 17/272,123

(22) PCT Filed: Aug. 30, 2019

(86) PCT No.: PCT/US2019/049173
§ 371 (c)(1),
(2) Date: Feb. 26, 2021

(87) PCT Pub. No.: WO2020/047483
PCT Pub. Date: Mar. 5, 2020

(65) Prior Publication Data
US 2021/0328464 A1    Oct. 21, 2021

Related U.S. Application Data (60) Provisional application No. 62/724,771, filed on Aug. 30, 2018.

(51) Int. Cl.
*H02K 1/14* (2006.01)
*H02K 3/18* (2006.01)
(Continued)

(52) U.S. Cl.
CPC ............. *H02K 1/145* (2013.01); *H02K 3/18* (2013.01); *H02K 3/325* (2013.01); *H02K 15/022* (2013.01)

(58) Field of Classification Search
CPC ........ H02K 1/145; H02K 15/022; H02K 3/18; H02K 3/20; H02K 3/325
See application file for complete search history.

(56) References Cited

U.S. PATENT DOCUMENTS

| 4,379,276 A | 4/1983 | Bouchara et al. |
| 4,509,564 A | 4/1985 | Sedgewick |

(Continued)

FOREIGN PATENT DOCUMENTS

| CN | 101741200 | 6/2010 |
| DE | 4436626 | 1/1996 |

(Continued)

OTHER PUBLICATIONS

Alaeddini, et al.: "Influence of Various Structural Factors of Claw Pole Transverse Flux Permanent Magnet Machines on Internal Voltage using Finite Element Analysis." Serbian Journal of Electrical Engineering, vol. 12, No. 2, Jun. 2015, 129-143. 15 pages.

*Primary Examiner* — Naishadh N Desai
(74) *Attorney, Agent, or Firm* — Harter Secrest & Emery LLP (57) ABSTRACT

A claw-pole motor having a rotor assembly orientated about a longitudinal axis, a stator assembly having a first plurality of stator teeth and a second plurality of stator teeth orientated radially about the longitudinal axis and extending axially in opposite directions to each other and alternating about the longitudinal axis, a first gap in the stator assembly orientated about the longitudinal axis, a second gap orientated about the longitudinal axis and extending both axially and radially between the first plurality of stator teeth and the second plurality of stator teeth, first electromagnetic windings disposed in the first gap and second electromagnetic windings disposed in the second gap, the first and second windings configured to be selectively energized to exert a torque on the rotor assembly.

20 Claims, 13 Drawing Sheets

(51) Int. Cl.
*H02K 3/32* (2006.01)
*H02K 15/02* (2006.01)

(56) References Cited

U.S. PATENT DOCUMENTS

| | | |
|---|---|---|
| 5,483,116 A | 1/1996 | Kusase et al. |
| 6,060,800 A | 5/2000 | Suzuki et al. |
| 6,774,512 B2 | 8/2004 | Takagi et al. |
| 6,833,651 B2 | 12/2004 | Pflueger |
| 7,135,802 B2 | 11/2006 | Seki et al. |
| 7,692,344 B2 | 4/2010 | Masaki et al. |
| 7,714,475 B2 | 5/2010 | Enomoto et al. |
| 7,994,684 B2 | 8/2011 | Inoue et al. |
| 9,407,129 B2 | 8/2016 | Shlakhetski et al. |
| 9,887,608 B2 | 2/2018 | Takemoto et al. |
| 2006/0006744 A1* | 1/2006 | Nashiki ............... H02K 1/278 310/49.37 |
| 2009/0001843 A1 | 1/2009 | Enomoto et al. |
| 2017/0366052 A1* | 12/2017 | Nagasaki ............... H02K 3/18 |

FOREIGN PATENT DOCUMENTS

| | | |
|---|---|---|
| GB | 191513904 | 10/1916 |
| JP | 2009219192 A * | 9/2009 |
| JP | 2015192551 A * | 11/2015 |

\* cited by examiner

CLAW POLE MOTOR WITH A RING COIL AND A MEANDERING COIL

TECHNICAL FIELD

The present invention relates generally to claw-pole motors, and more particularly to a claw-pole motor having an improved stator and coil assembly.

BACKGROUND ART

Claw-pole type motors generally comprise a stator having a plurality of circumferentially spaced axially overlapping claw poles, and a rotor having a plurality of permanent magnets arranged along its circumference, wherein the motor rotates the rotor using electromagnetic forces generated between the stator and the rotor.

For example, U.S. Patent Publication No. 2009/0001843 entitled "Rotating Electrical Machine" is directed to a motor having a claw-pole stator with a stator core that includes a plurality of claw poles and a stator coil wound inside the stator core, and a rotor rotatably disposed at a position facing opposite the claw poles.

U.S. Pat. No. 7,714,475 entitled "Multiple Phase Claw Pole Type Motor" is directed to a multiple phase claw-pole type motor having a plurality of claw poles with claw portions extending in an axial direction and having a magnetic pole surface facing a rotor and being separated from the rotor by a small gap. A radial yoke portion extends radially outwardly from the claw portion, and an outer peripheral yoke extends from the radial yoke portion in the same direction as the direction of extension of the claw portion. The claw poles may be alternately placed so that a distal end of each claw portion faces the radial yoke of an adjacent one of the claw poles to form a stator core. An annular coil may be interposed between each adjacent pair of the claw poles in the stator core to form a stator.

BRIEF SUMMARY

With parenthetical reference to corresponding parts, portions or surfaces of the disclosed embodiment, merely for the purposes of illustration and not by way of limitation, a claw-pole motor (100, 200) is provided comprising: a stator assembly (150, 150A); a rotor assembly (110, 210) orientated about a longitudinal axis (122) and mounted for movement about the longitudinal axis (122) relative to the stator assembly (150); a radial air gap (154) between the stator assembly (150) and the rotor assembly (110); the stator assembly (150) comprising a first stator portion (182) having a plurality of first stator teeth (183) orientated radially about the longitudinal axis (122) and extending axially in a first direction and a second stator portion (184) having a plurality of second stator teeth (185) orientated radially about the longitudinal axis (122) and extending axially in a second direction opposite to the first direction; the first stator portion (182) and the second stator portion (184) defining a first gap (192) orientated about the longitudinal axis (122) and extending axially between the first stator portion (182) and the second stator portion (184); the plurality of first stator teeth (183) of the first stator portion (182) extending axially in the first direction beyond at least a portion of the plurality of second stator teeth (185) of the second stator portion (184) to form a second gap (194) orientated about the longitudinal axis (122) and extending both axially and radially between the plurality of first stator teeth (183) of the first stator portion (182) and the plurality of second stator teeth (185) of the second stator portion (184); first electromagnetic windings (160) disposed in the first gap (192) between the first stator portion (182) and the second stator portion (184) and configured to be selectively energized to exert a torque on the rotor assembly (110, 210); and second electromagnetic windings (170) disposed within the second gap (194) between the plurality of first stator teeth (183) of the first stator portion (182) and the plurality of second stator teeth (185) of the second stator portion (184) of the stator assembly (150), the second electromagnetic windings (170) configured to be selectively energized to exert a torque on the rotor assembly (110, 210).

The rotor assembly (110) may comprise a rotary shaft (120) that is non-magnetic. The rotor assembly (110, 210) may comprise a plurality of magnets (130, 230) spaced about the longitudinal axis (122). The plurality of magnets (130) may be permanently attached to a rotary shaft (120). The total number of the plurality of first stator teeth (183) of the first stator portion (182) and the plurality of second stator teeth (185) of the second stator portion (184) may be equal to the total number of the plurality of magnets (130, 230) of the rotor assembly (110). The total number of the plurality of first stator teeth (183) and the plurality of second stator teeth (185) of the stator assembly (150) may be forty. The first stator portion (182) of the stator assembly (150) may comprise a first stator body portion (186) and a first stator extension portion (187) and the second stator portion (184) of the stator assembly (150) may comprise a second stator body portion (188) and a second stator extension portion (189). The stator assembly (150) and the rotor assembly (110) may comprise a magnetic flux path (132) extending from a first magnet of the plurality of magnets (130) across the radial air gap (154) to a first stator tooth of the plurality of first stator teeth (183) of the first stator portion (182) of the stator assembly (150). The magnetic flux path (132) may extend from the first stator tooth of the plurality of first stator teeth (183) of the first stator portion (182) through the first stator extension portion (187) and the first stator body portion (186) of the first stator portion (182) to the second stator portion (184) of the stator assembly (150). The magnetic flux path (132) may extend from the first stator body portion (186) of the first stator portion (182) through the second stator body portion (188) and the second stator extension portion (189) to a second stator tooth of the plurality of second stator teeth (185) of the second stator portion (184) of the stator assembly (150). The magnetic flux path (132) may extend from the second stator tooth of the plurality of second stator teeth (185) of the second stator portion (184) across the radial air gap (154) to a second magnet of the plurality of magnets (130).

The claw-pole motor (200) may comprise a second stator assembly (150B) having third electromagnetic windings (160B) configured to be selectively energized to exert a torque on the rotor assembly (110, 210) and fourth electromagnetic windings (170B) configured to be selectively energized to exert a torque on the rotor assembly (110, 210). The claw-pole motor (200) may comprise a third stator assembly (150C) having fifth electromagnetic windings (160C) configured to be selectively energized to exert a torque on the rotor assembly (110, 210) and sixth electromagnetic windings (170B) configured to be selectively energized to exert a torque on the rotor assembly (110, 210). The stator assembly (150A), the second stator assembly (150B), and the third stator assembly (150B) may be spaced axially along the longitudinal axis (122) and may be radially aligned relative to the longitudinal axis (122). An axially distance between the stator assembly (150A) and the second stator assembly (150B) may be greater than or equal to a radial distance of the radial air gap (154) between the rotor assembly (110) and the stator assembly (150A, 150B, 150C).

The rotor assembly (110) may comprise a magnetic angular pitch and the stator assembly (150) may comprise a stator teeth angular pitch, the magnetic angular pitch being equal to the stator teeth angular pitch. The first electromagnetic windings (160) may form an annular coil. The second electromagnetic windings (170) may be disposed in an axial zig zag pattern about the longitudinal axis (122).

DETAILED DESCRIPTION OF THE EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIGS. 1-12 thereof, a claw-pole motor is provided, of which a first embodiment is generally indicated at 100. Claw-pole motor 100 is shown as broadly including rotor assembly 110 and stator assembly 150 in a single stack configuration. Rotor assembly 110 is operationally configured to rotate about longitudinal axis 122 relative to stator assembly 150. Rotor assembly 110 and stator assembly 150 are separated by radial air gap 154 therebetween.

Rotor assembly 110 includes inner non-magnetic rotary shaft 120 orientated about longitudinal axis 122 and a plurality of outer magnets 130 positioned around the outer circumference of rotary shaft 120.

Rotary shaft 120 is non-magnetic. Non-magnetic rotary shaft 120 provides a significant advantage over a magnetic rotary shaft in that it eliminates magnetic interferences with neighboring devices. In a traditional motor, such as a surface mounted magnetic motor, a magnetic steel rotor hub is required to complete the magnetic flux return path. The use of a magnetic hub reduces the remaining non-magnetic shaft diameter, which is undesirable in some applications. It is often the practice to make the rotor hub and motor shaft of one piece out of magnetic steel. When a position feedback device, such as a resolver or an encoder, is mounted on the same shaft, there are magnetic interferences. Claw-pole motor 100 eliminates such issues and preserves the valuable room for a motor shaft.

Each of magnets 130 extends axially along longitudinal axis 122 of rotary shaft 120 and are positioned radially about axis 122 on the outer circumference of rotary shaft 120 to form magnetic poles. Magnets 130 are permanently affixed around the outer circumference of rotary shaft 120.

While FIGS. 1-5 show a claw-pole motor 100 having forty circumferentially spaced magnets 130 and magnetic poles, the number of magnets may be varied to correspond to the number of stator teeth of stator assembly 150 and/or the number of zig zags in solenoidal coil or windings 170. For example, the number of magnets may be equal to the number of magnetic claw poles/stator teeth 183 and 185 of stator assembly 150. Furthermore, if a long axial length is required, permanent magnets 130 may be assembled in segments to avoid cracking or breaking. In such an embodiment, permanent magnets 130 are formed of axially spaced segments along rotary shaft 120.

Adjacent magnets 130 of claw-pole motor 100 may have opposite N-S polarities. This N-S array requires a magnetic yoke on which magnets 130 are mounted. Alternatively, the magnetic array may comprise a repeating E-N-W-S polarization sequence, with the spacing of the N and S polarity magnets being spaced with the same angular distance as stator teeth 183 and 185 of first and second portions 182 and 184, respectively, of enclosure assembly 180. This E-N-W-S magnet array does not require a magnetic yoke.

Figure 16:
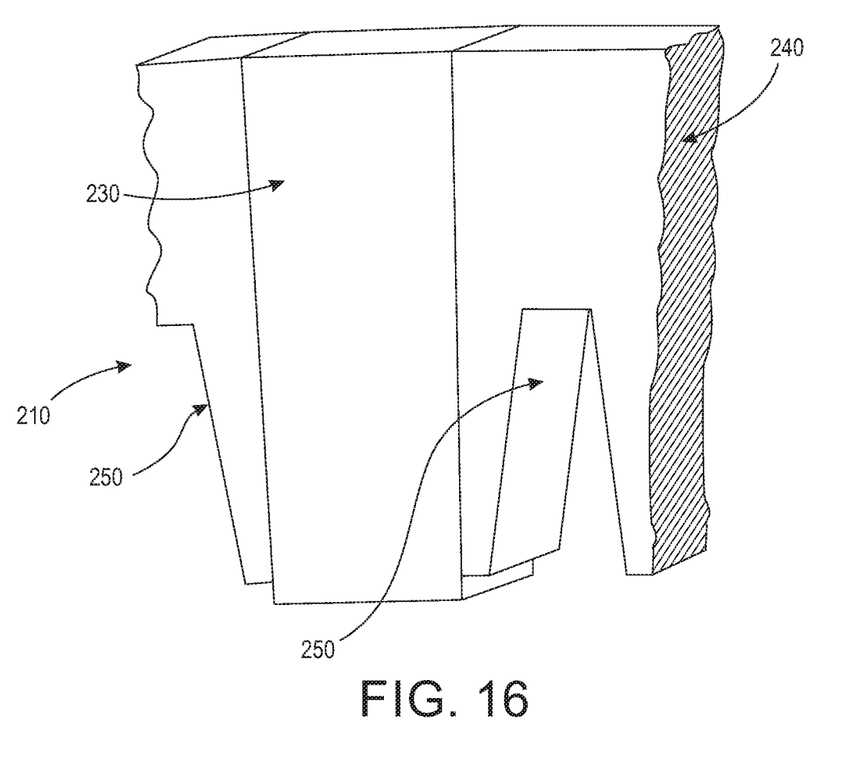
FIG. 16 is a partial enlarged perspective view of an alternative embodiment of the rotor assembly shown in FIG. 1.

In the rotor assembly embodiment shown in FIG. 16, rotor assembly 210 includes a plurality of flux concentrators 240 between the plurality of magnetic poles 230. In this embodiment, each of flux concentrators 240 and magnetic poles 230 extend axially along longitudinal axis 122 of rotary shaft 120 and are positioned radially about axis 122 such that each flux concentrator 240 alternates with each magnetic pole 230 about rotary shaft 120. In addition, each flux concentrator 240 is provided with notch 250 extending radially outward from the inner surface of each flux concentrator 240. Notches 250 remove excess weight and provide a path for air cooling rotor assembly 210.

Rotor assembly 110 may be a monolithic element constructed by an additive manufacturing process. For example, rotor assembly 110 may be made by an additive manufacturing process with magnet and iron powder.

Stator assembly 150 generally comprises annular solenoidal coil 160 and zig zag solenoidal coil 170 within enclosure assembly 180.

Zig zag solenoidal coil 170 may be a square, triangular, or sinusoidal type zig zag solenoidal coil or any combination thereof. Annular solenoidal coil 160 and zig zag solenoidal coil 170 each comprise a plurality of conductive windings that may be selectively energized.

Enclosure assembly 180 includes left portion 182 and right portion 184. Left portion 182 is a generally annular member having outer body portion 186, extension portion 187, and a plurality of circumferentially spaced triangular stator teeth 183. Extension portion 187 extends inwardly from outer body portion 186 to support stator teeth 183. Stator teeth 183 form a first plurality of magnetic claw poles. Stator teeth 183 are positioned radially around longitudinal axis 122 of rotary shaft 120 and extend axially along longitudinal axis 122. Right portion 184 is a generally annular member having outer body portion 188, extension portion 189, and a plurality of circumferentially spaced triangular stator teeth 185. Extension 189 extends inwardly from outer body portion 188 to support stator teeth 185. Stator teeth 185 form a second plurality of magnetic claw poles. Stator teeth 185 are positioned radially around longitudinal axis 122 of rotary shaft 120 and extend axially along longitudinal axis 122.

Figure 1:
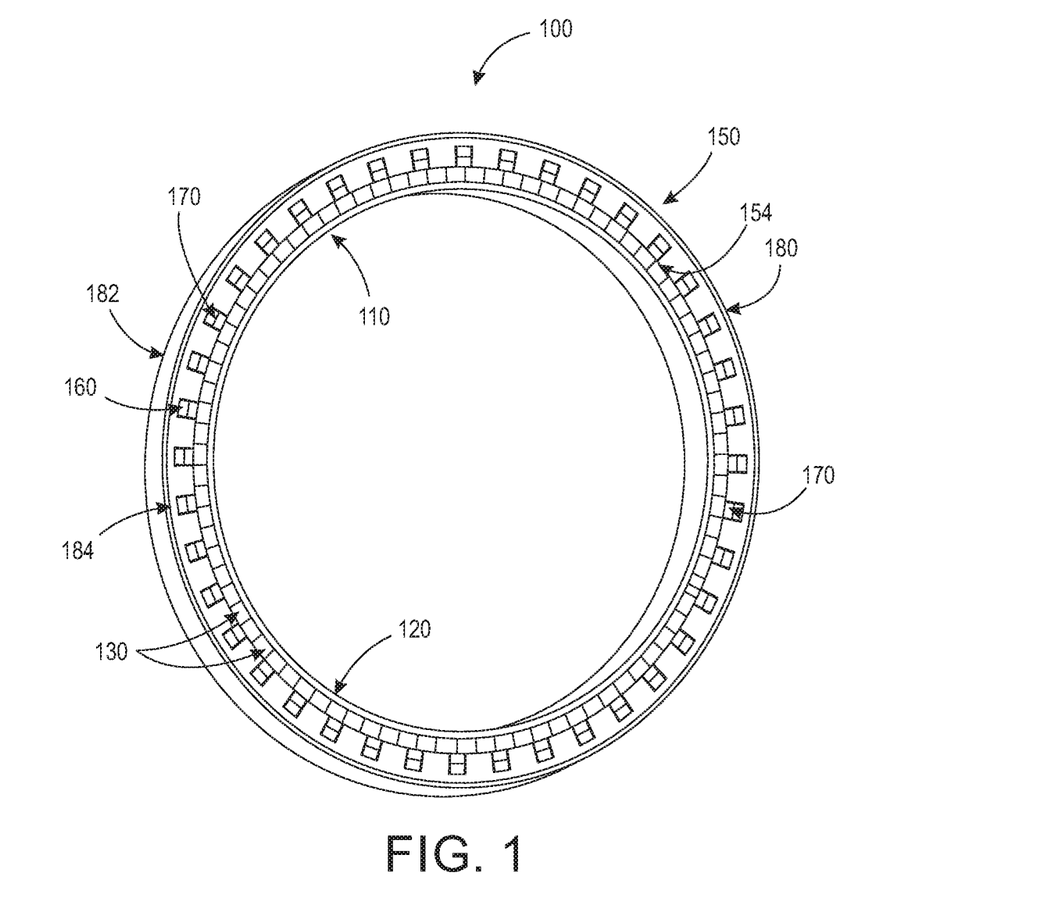
FIG. 1 is a perspective view of a first embodiment of a claw-pole motor having an improved stator and rotor assembly.
Figure 2:
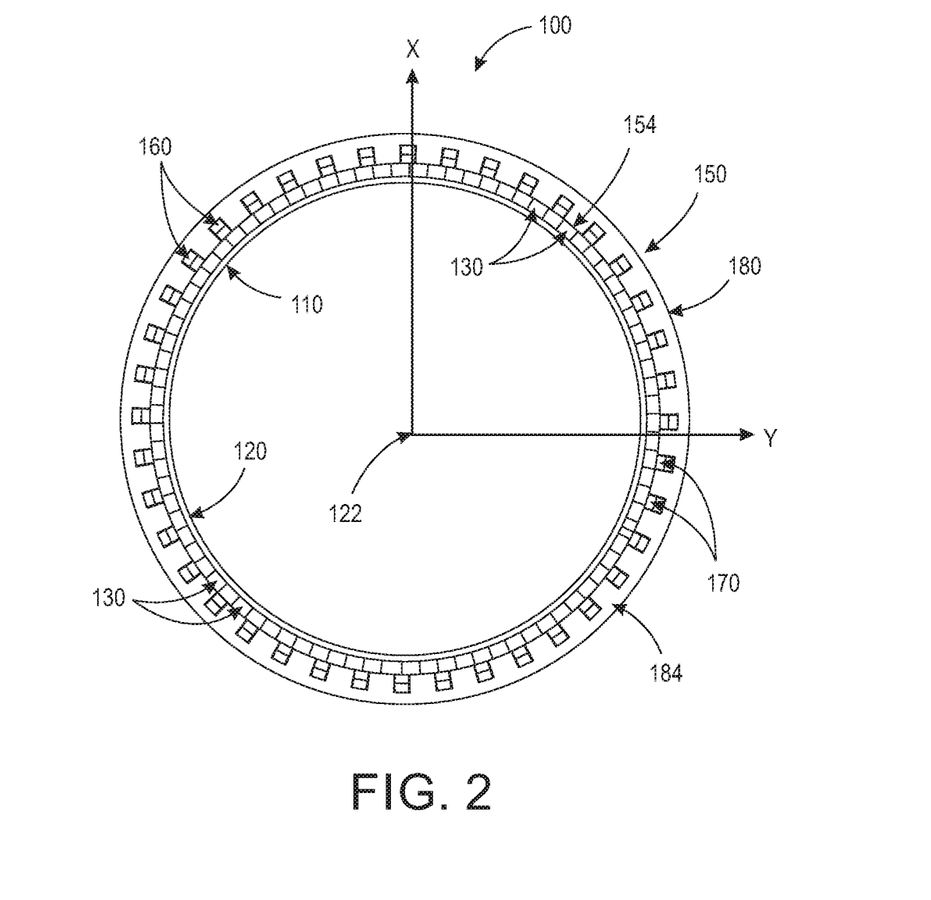
FIG. 2 is a right side view of the claw-pole motor shown in FIG. 1.
Figure 3:
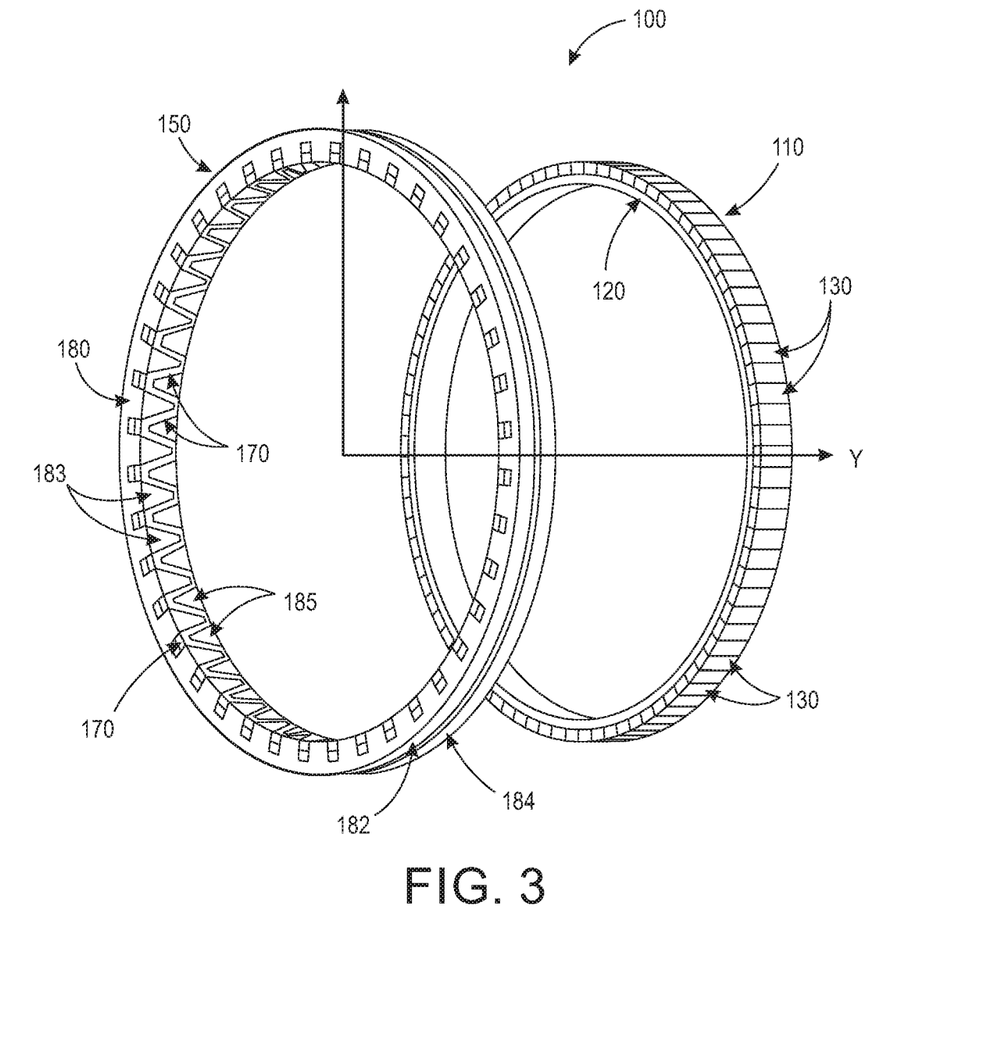
FIG. 3 is a partial exploded perspective view of the claw-pole motor shown in FIG. 1, showing the rotor assembly and the stator assembly.
Figure 4:
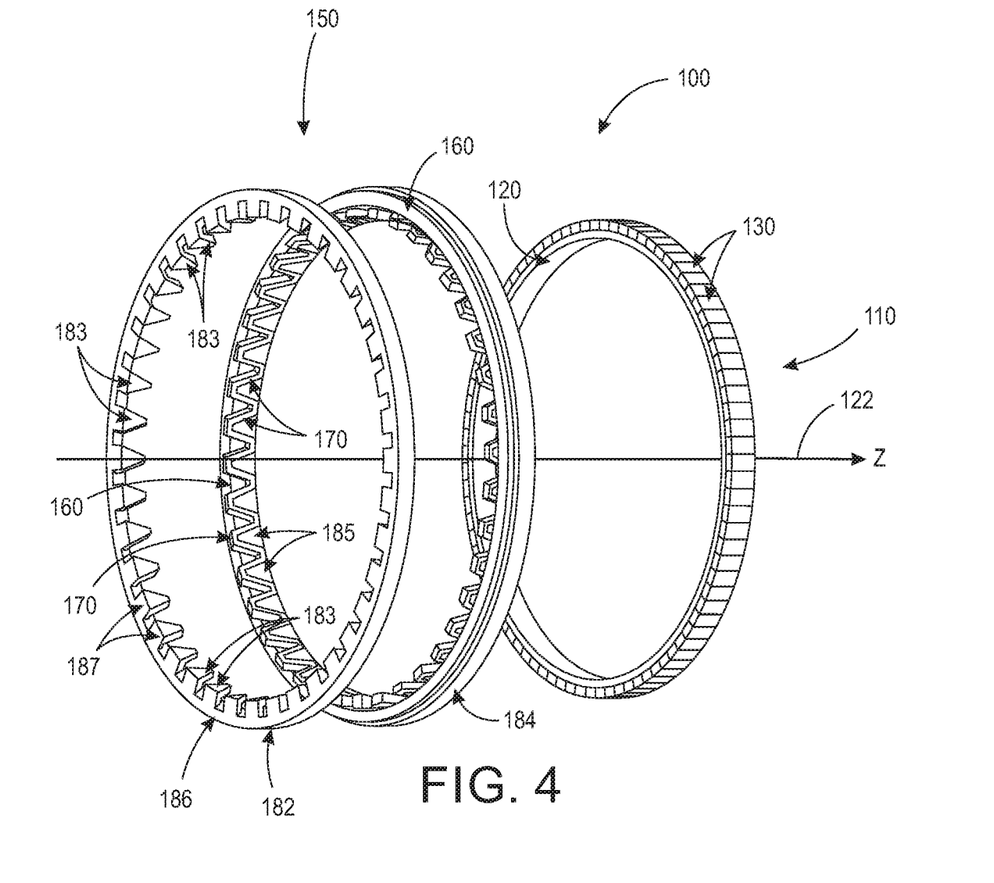
FIG. 4 is a partial exploded perspective view of the claw-pole motor shown in FIG. 3, showing the stator assembly further exploded.
Figure 5:
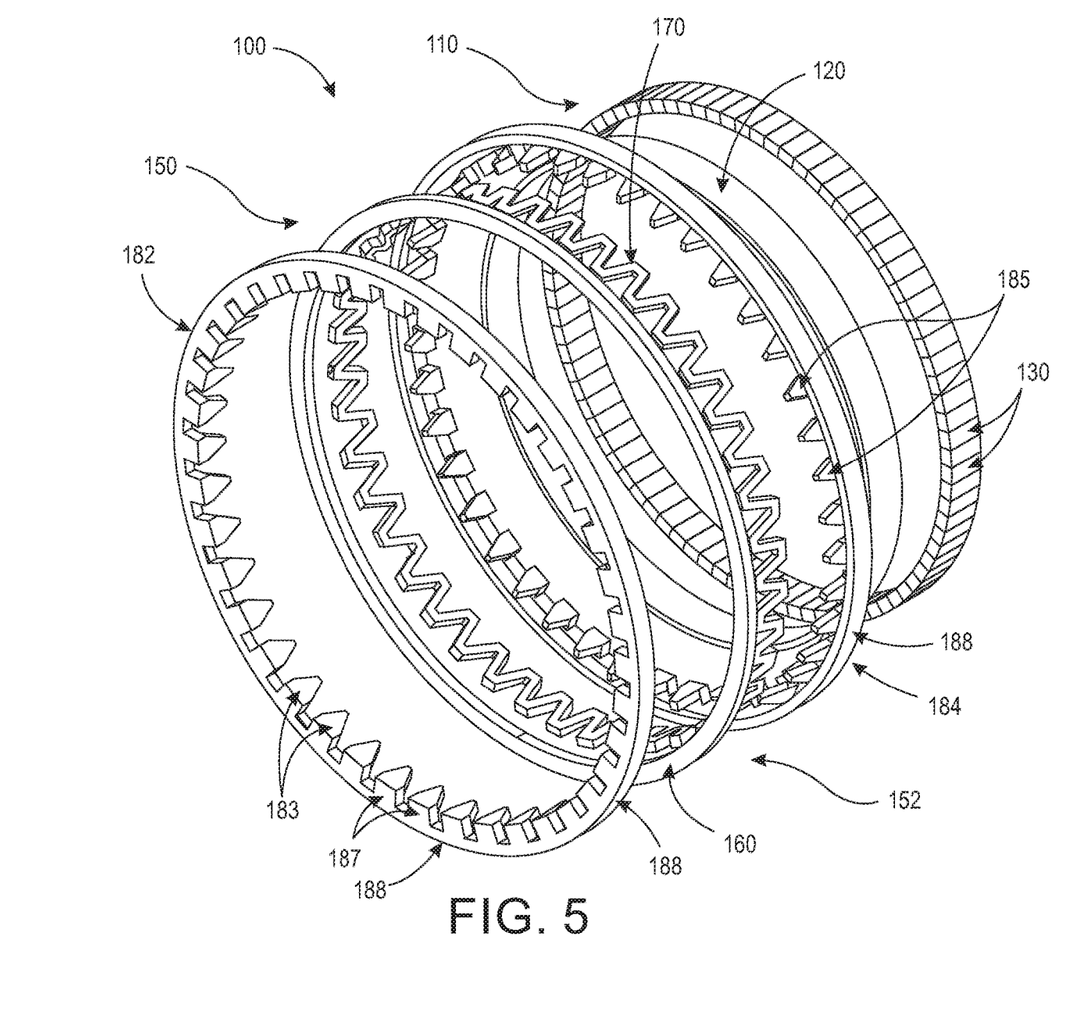
FIG. 5 is an exploded perspective view of the claw-pole motor shown in FIG. 4, showing both the rotor assembly and the stator assembly further exploded.
Figure 6:
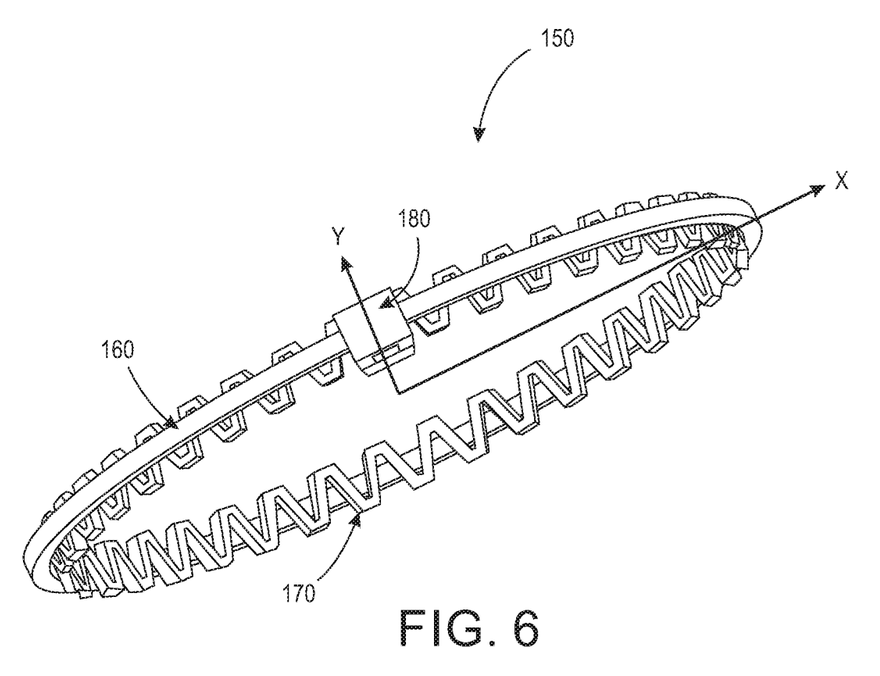
FIG. 6 is a perspective view of the annular solenoidal coil, the zig zag solenoidal coil, and a section of the coil enclosure of the claw-pole motor shown in FIG. 1.
Figure 7:
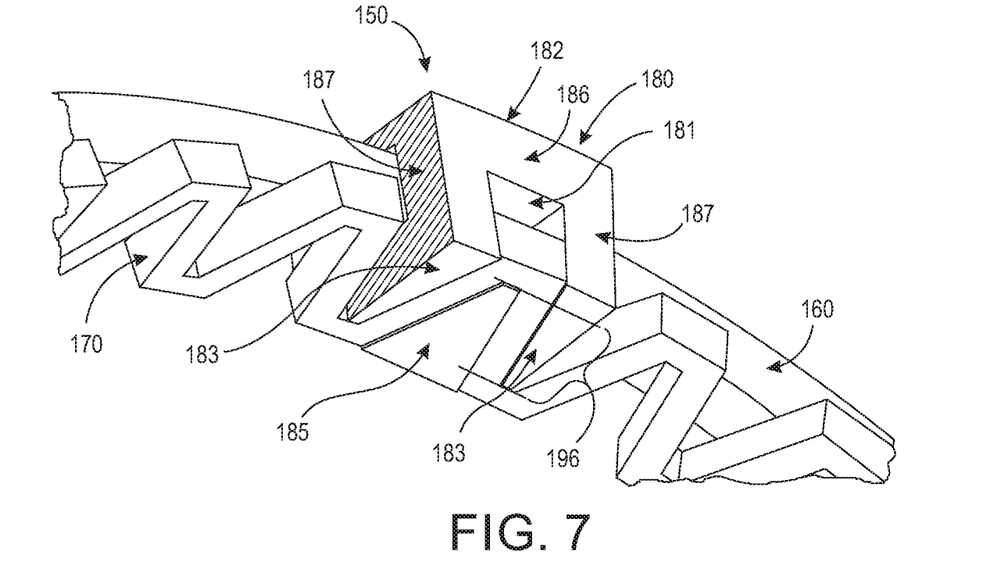
FIG. 7 is an enlarged partial perspective view of the coil enclosure section, annular solenoidal coil, and zig zag solenoidal coil shown in FIG. 6.
Figure 8:
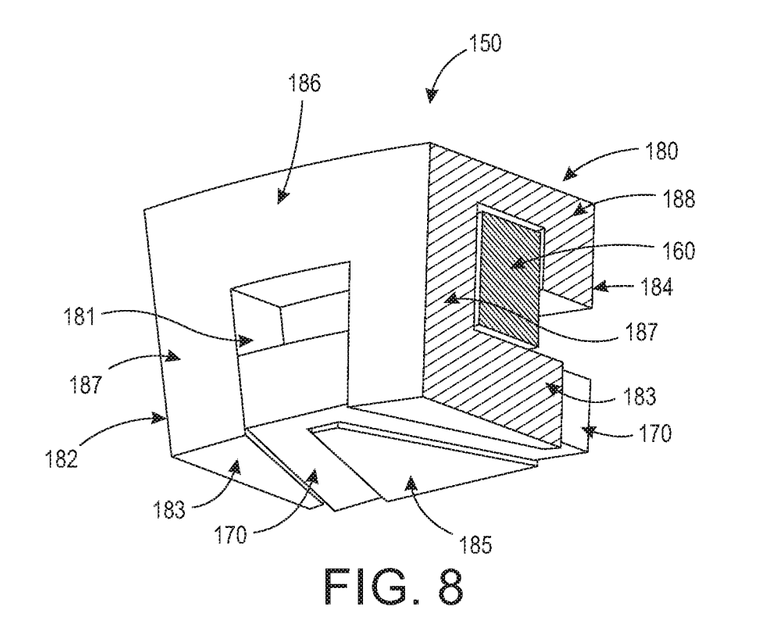
FIG. 8 is a front right partial perspective view of the coil enclosure section, annular solenoidal coil, and zig zag solenoidal coil shown in FIG. 7.
Figure 9:
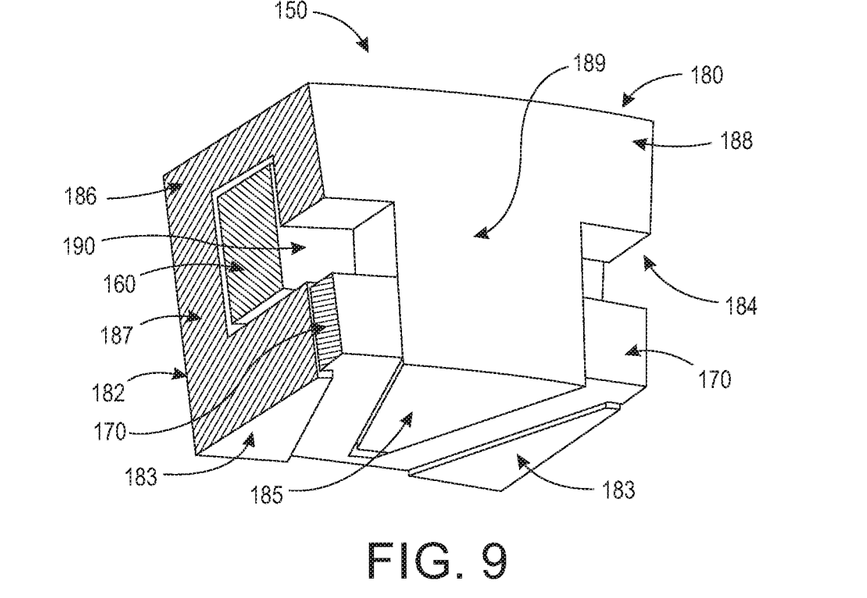
FIG. 9 is a rear perspective view of the coil enclosure section, annular solenoidal coil, and zig zag solenoidal coil shown in FIG. 8.
Figure 10:
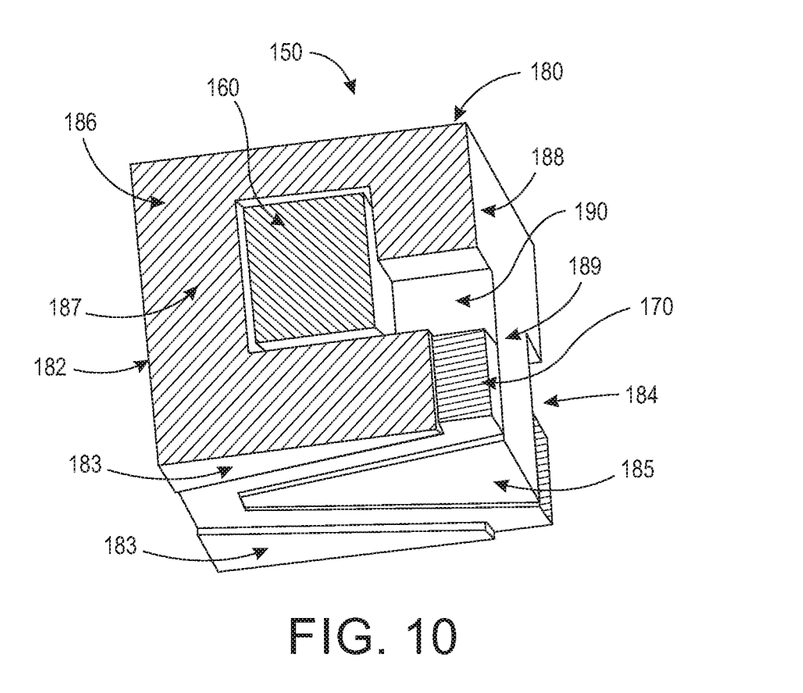
FIG. 10 is a left perspective view of the coil enclosure section, annular solenoidal coil, and zig zag solenoidal coil shown in FIG. 9.
Figure 11:
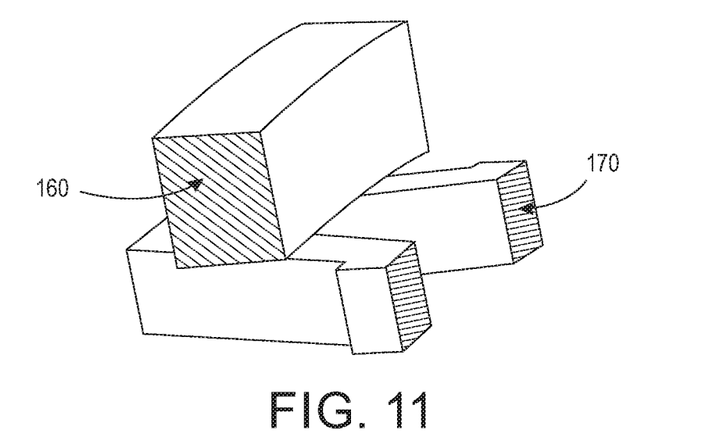
FIG. 11 is an upper left perspective view of the annular solenoidal coil and zig zag solenoidal coil shown in FIG. 9.
Figure 13:
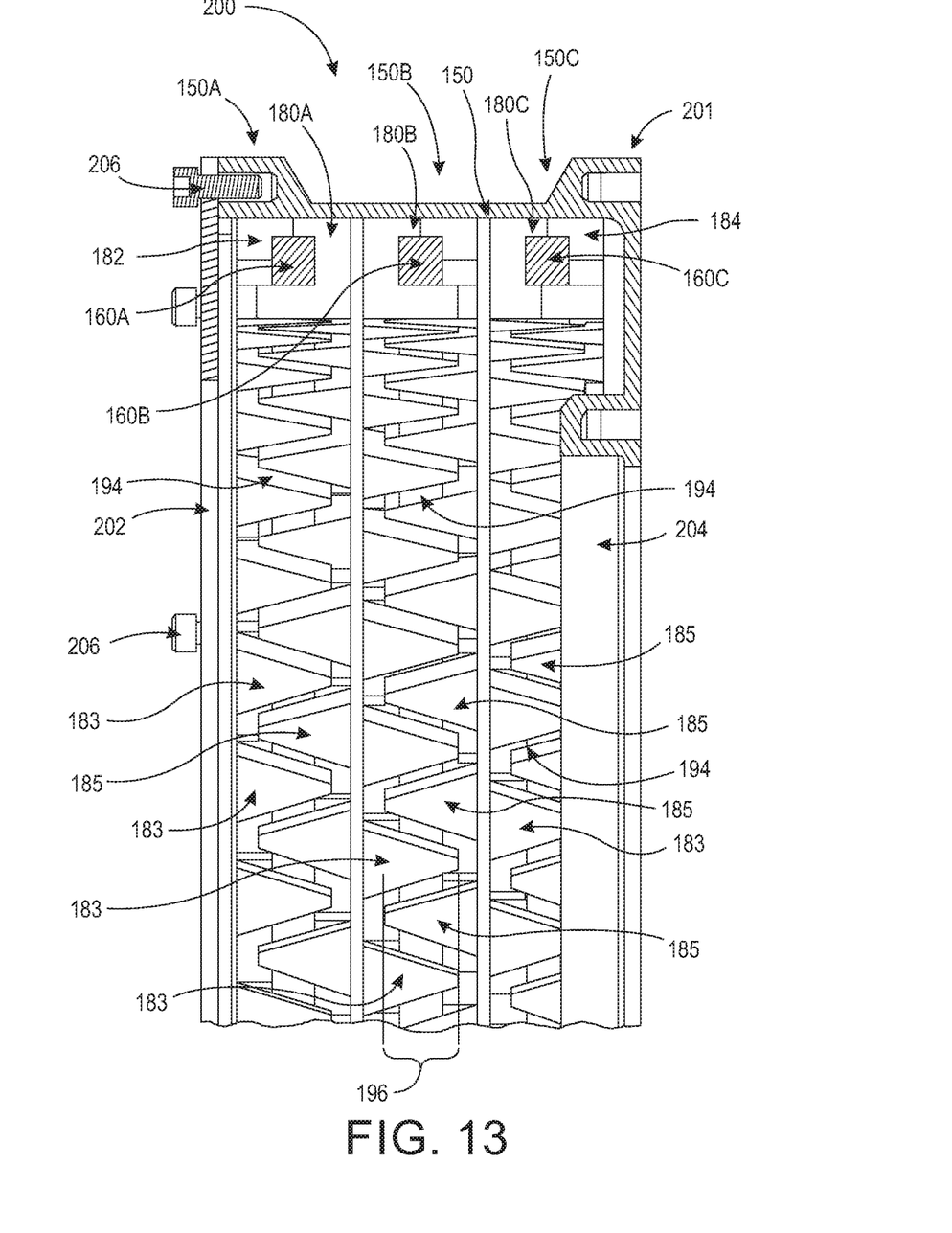
FIG. 13 is a cross-sectional side view of a second embodiment of a claw-pole motor having an improved stator assembly in a triple stack configuration.

Thus, left portion 182 and right portion 184 of enclosure assembly 180 provide a plurality of inner cross-facing, alternating and overlapping stator teeth 183 and 185. Stator teeth 183 and 185 extend axially in opposite directions to each other relative to longitudinal axis 122. As shown, stator teeth 183 of left portion 182 alternate about axis 122 and overlap axially and radially with stator teeth 184 of right portion 184 of enclosure assembly 180. As shown in FIGS. 7 and 13, stator teeth 183 of first portion 182 of enclosure assembly 180 and stator teeth 185 of second portion 184 of enclosure assembly 180 define axial overlap 196.

Figure 12:
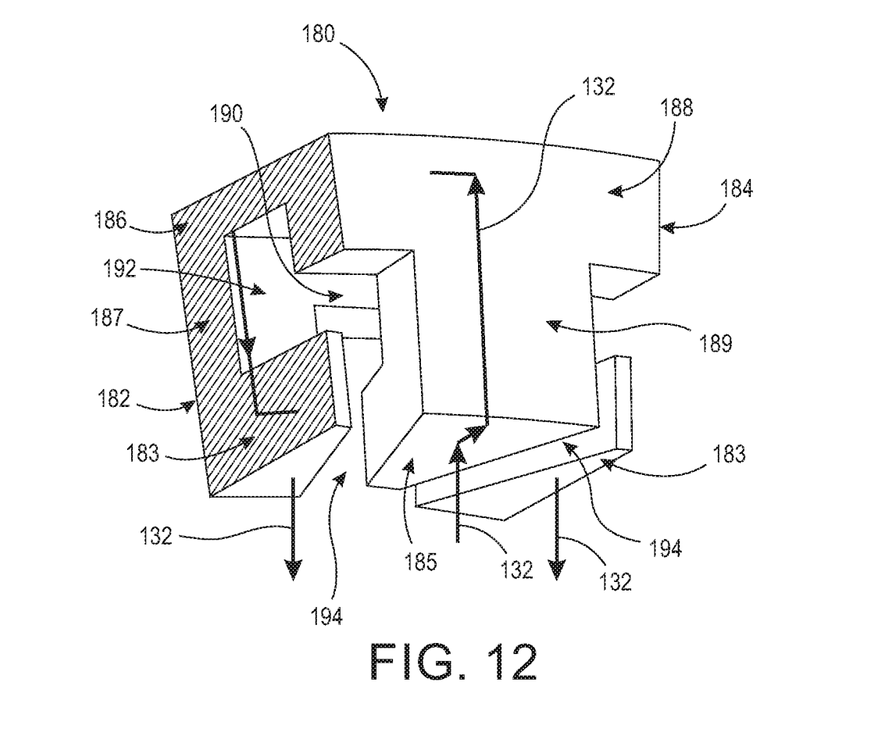
FIG. 12 is a perspective view of the coil enclosure section shown in FIG. 9.

Annular stator space 192 is formed axially between extension portions 187 and 189 of left and right portions 182 and 184 of enclosure 180, respectively, and radially between outer body portions 186 and 188 of left and right portions 182 and 184 and inner overlapping teeth 183 and 185 of left and right portions 182 and 184, respectively, of enclosure assembly 180. Annular solenoid coil 160 is disposed in such annular space 192. Thus, portions 182 and 184 of enclosure assembly define stator channel or gap 192 therebetween, as shown in FIG. 12, which extends about longitudinal axis 122 of rotary shaft 120, and annular solenoidal coil 160 is positioned within stator gap 192 of enclosure assembly 180 about longitudinal axis 122 of rotary shaft 120. Solenoidal coil 160 thereby extends around longitudinal axis 122 of rotary shaft 120 radially outside of magnets 130 and rotary shaft 120.

A zig zag space or gap 194 is also formed between opposed stator teeth 183 and 185 of left and right portions 182 and 184, respectively, of enclosure assembly 180 about longitudinal axis 122 of rotary shaft 120. Solenoid coil 170 is disposed in such annular space 194. Thus, as shown in FIGS. 3 and 7-12, stator teeth 183 of first portion 182 of enclosure assembly 180 and stator teeth 185 of second portion 184 of enclosure assembly 180 define stator teeth channel or gap 194 therebetween that extends radially and weaves axially around longitudinal axis 122 of rotary shaft 120, and zig zag solenoidal coil 170 is positioned within gap 194 axially between stator teeth 183 of first portion 182 of enclosure assembly 180 and stator teeth 185 of second portion 184 of enclosure assembly 180. Zig zag solenoidal coil 170 thereby extends around longitudinal axis 122 of rotary shaft 120 radially outside of magnets 130 and rotary shaft 120 but radially inside of solenoid coil 160.

In this embodiment, enclosure assembly 180 includes enclosure gaps 181 in first extension 187 of left portion 182 of enclosure assembly 180 and enclosure gaps 190 in second extension 189 of second portion 184 of enclosure assembly 180. First and second enclosure gaps 181 and 190 allow annular solenoidal coil 160 to not be completely encapsulated within enclosure assembly 180. Enclosure gaps 181 and 190 magnetically isolate opposing stator teeth 183 and 185 from outer body portions 186 and 188 of left and right portions 182 and 184, respectively, of enclosure assembly 180 and reduce leakage flux, which results in increased peak torque of claw-pole motor 100.

Typically, the space between stator teeth 183 of left portion 182 and stator teeth 185 of right portion 184 has just been empty space. In this embodiment, zig zag solenoidal coil 170 takes advantage of this empty space while improving performance of the motor due to this location. For example, adding a single turn zig zag winding 170 to a 5-turn main winding 160 improved peak output by approximately 40% and vastly improved torque linearity. Without zig zag solenoidal coil 170, claw-pole motor 100 would not be able to operate on 2-phases and still provide a rated output without increasing size and weight. Any air gaps between stator teeth 183 and 185 and zig zag solenoidal coil 170 are used for electrical insulation. Insulated zig zag solenoidal coil 170 may generally be located with its inner diameter being slightly greater than the inner diameter of stator assembly 150 and stator teeth 183 and 185.

In motor embodiment 100, the total number of stator teeth 183 and 185 between left portion 182 and right portion 184 of enclosure assembly 180 is equal to the total number of magnets 130 and magnetic poles of rotor assembly 110. Each of left portion 182 and right portion 184 of enclosure assembly 180 has forty triangular stator teeth that are positioned in alternating and overlapping order for a total of 80 stator teeth.

In one embodiment, claw-pole motor 100 has at least one phase. For a one-phase claw-pole motor, stator teeth 183 of left portion 182 and stator teeth 185 of right portion 184 of enclosure assembly 180 may be radially asymmetrical to provide a magnetically determined starting position. For a two or more phase claw-pole motor, teeth 183 of left portion 182 and stator teeth 185 of right portion 184 of enclosure assembly 180 may be radially symmetrical.

Left portion 182 and right portion 184 of enclosure assembly 180 may be manufactured using a powdered metal compaction process in which powdered magnetic material (e.g., Hoganas Somaloy 700HR 5P) is compacted in a custom die. Other types of powders may be used as alternatives, depending on the application. Enclosure assembly 180 is made with magnetically soft materials. Examples include, without limitation, low carbon steels, silicon steels, iron-cobalt alloys, and molded or additive manufactured (AM) powder iron. Left portion 182 and right portion 184 of enclosure assembly 180 may each be monolithic elements constructed by an additive manufacturing process or enclosure assembly 180 may be a monolithic enclosure constructed by an additive manufacturing process. For example, stator assembly 150 may be made by an additive manufacturing process with copper and iron powder.

Annular solenoidal coil 160 and zig zag solenoidal coil 170 comprise electromagnetic windings that include at least one turn. Solenoidal coils 160 and 170 are each wound with copper, aluminum wires, ribbons, or any other material suitable for the intended purpose and understood by one of ordinary skill in the art. While annular solenoidal coil 160 and zig zag solenoidal coil 170 are shown with a relatively square cross-section, other embodiments may include an annular solenoidal coil and a zig zag solenoidal coil having a circular or oblong cross-section.

Zig zag solenoidal coil 170 is a transverse flux-type winding. Zig zag solenoidal coil 170 may be energized to drive motor 100 by itself or in combination with annular motor coil 160. Zig zag solenoidal coil 170 is wound as a toroid and shaped to weave between stator teeth 183 and 185 so that all of the flux linking annular solenoidal coil 160 also links zig zag solenoidal coil 170. Aside from adding to annular solenoidal coil 160 and increasing the effective torque constant and motor constant of the claw-pole motor, the location of zig zag solenoidal coil 170 produces much lower leakage flux than annular solenoidal coil 160 such that more total excitation is possible with less flux leakage from windings 160 and 170, which results in higher peak torque for the same total excitation along with higher ultimate peak torque.

A single-turn coil can be formed flat in a zig-pattern then rolled into a round shape to form solenoid coil 170. Litz wire with small gauge wire may be used to form zig zag solenoidal coil 170. Zig zag solenoidal coil 170 may be broadly connected to annular solenoidal coil 160 in each phase and in series, although zig zag solenoidal coil 170 may also be separately excitable. At low speeds and low frequencies where Litz wire is not required, zig zag solenoidal coil 170 may be formed from solid conductors. Starting with a toroid coil, a round coil may be formed by pressing either side with claw shaped forming tools, where the tools are free to slide radially while the coil is pressed into the final round zig zag shape.

Zig zag solenoidal coil 170 improves torque linearity and motor constant, allowing for higher ultimate loads to be achieved while reducing power losses in the claw-pole motor. In addition to directing magnetic flux to the stator teeth, zig zag solenoidal coil 170 adds additional winding space without increasing overall volume in a location that provides more peak torque than main solenoidal coil 160. Adding more winding space generally lowers losses and increases thermally limited motor output. In this embodiment, peak torque is also increased by a ratio in excess of the additional turns in zig zag solenoidal coil 170 to the turns in annular solenoidal coil 160, resulting in more continuous and peak power in the same overall volume. Peak torque will increase as the number of zig zag turns of zig zag solenoidal coil 170 is increased. Motor constant will also increase as the number of zig zag winding turns of zig zag solenoidal coil 170 increases to a point where the number of zig zag turns equals approximately 40% of the main winding turns of annular solenoidal coil 160. This ratio may vary and is a function of the depth of annular solenoidal coil 160, the axial length of stator assembly 150, the shape of magnets 130, the ratio of claw-pole width to pole pitch, the depth of magnets 130, the number of magnets 130, and the diameter of claw-pole motor 100.

Referring to FIG. 12, claw-pole motor 100 has a magnetic flux path 132 in which magnetic flux flows from a first magnet 130 of rotor assembly 110 across air gap 154 to a first stator tooth 185 of right portion 184 of enclosure assembly 180 of stator assembly 150. The magnetic flux then flows from stator tooth 185 through extension portion 189 and outer body portion 188 of right portion 184 of enclosure assembly 180 to outer body portion 186 of left portion 182 of enclosure assembly 180. Next, the magnetic flux flows from outer body portion 186 through extension portion 187 to a stator tooth 183 of left portion 182 of enclosure assembly 180 of stator assembly 150. The magnetic flux then flows from stator tooth 183 across air gap 154 to a second magnet 130 of rotor assembly 110 with an opposite polarity to the first magnet 130 of rotor assembly 110.

A series of annular solenoidal coils 160, zig zag solenoidal coils 170, and enclosure assemblies 180 may be stacked in repeating patterns with an angular shift among motor phases. As shown in the triple stack configuration of FIGS. 13-15, a plurality of stator assemblies 150A, 150B and 150C are stacked axially to form a multiphase motor. In the embodiment shown in FIGS. 13-15, three-phase claw-pole motor 200 includes three stator assemblies 150A, 150B and 150C enclosed in housing 201. Stator assemblies 150A, 150B and 150C are aligned axially in housing 201 and are sandwiched between first portion 202 and second portion 204 of housing 201. First and second portions 202 and 204 are axially coupled together by fasteners 206 to form housing 201. The axially distance or gap between adjacent stator assemblies 150A and 150B, and 150B and 150C, may be greater than or equal to the radial distance or gap 154 between rotor assembly 110 and stator assemblies 150A, 150B and 150C.

Figure 14:
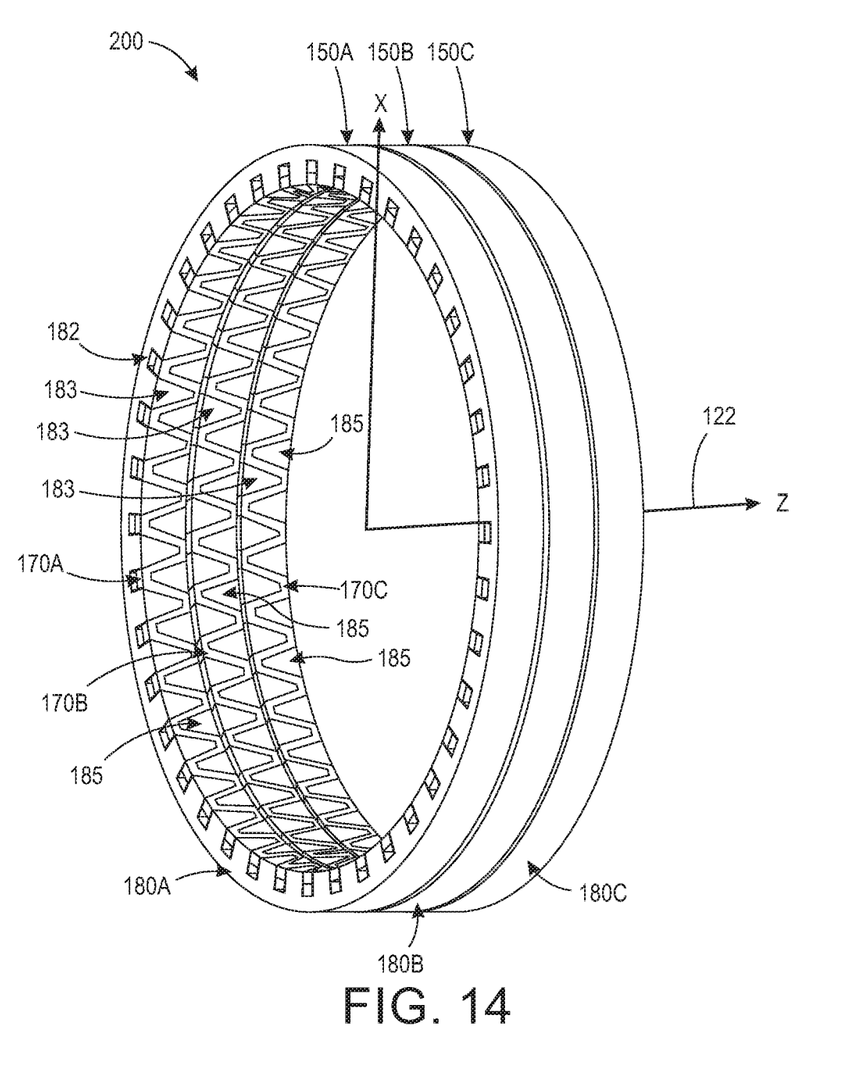
FIG. 14 is a perspective view of the stator assembly of the claw-pole motor shown in FIG. 13.
Figure 15:
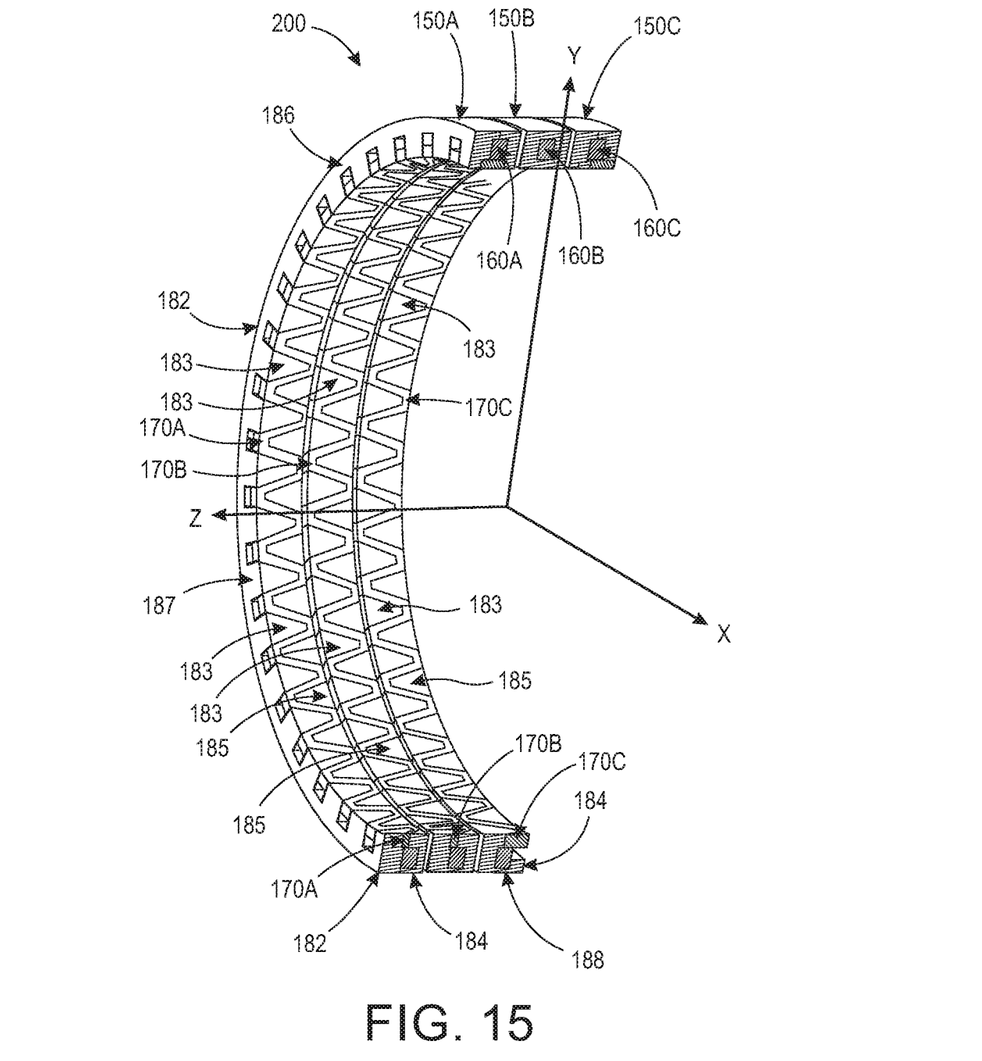
FIG. 15 is a longitudinal cross-sectional view of the stator assembly shown in FIG. 14.

Each of stator assemblies 150A, 150B and 150C includes annular solenoidal coil 160A, 160B and 160C and zig zag solenoidal coil 170A, 170B and 170C, respectively. Annular solenoidal coil 160A and zig zag solenoidal coil 170A are for the first of the three phases, annular solenoidal coil 160B and zig zag solenoidal coil 170B are for the second of the three phases, and annular solenoidal coil 160C and zig zag solenoidal coil 170C are for the third of the three phases. Thus, solenoidal coils 160 and 170 and enclosure assemblies 180 may be stacked axially in a repeating pattern with an angular shift among the motor phases.

Motor 200 provides a number of benefits. For example, motor 200 has a high level of fault-tolerance and may be used in high reliability applications, such as aerospace or extreme environments, that require total isolation of the motor electrical windings physically among the motor phases.

The present disclosure contemplates that many changes and modifications may be made. Therefore, while forms of the improved claw-pole motor have been shown and described, and a number of alternatives discussed, persons skilled in this art will readily appreciate that various additional changes and modifications may be made without departing from the scope of the invention, as defined and differentiated by the following claims.

What is claimed is:

1. A claw-pole motor comprising:
a first stator assembly;
a rotor assembly orientated about a longitudinal axis and mounted for movement about the longitudinal axis relative to the first stator assembly;
a radial air gap between the first stator assembly and the rotor assembly;
the first stator assembly comprising a first stator portion having a plurality of first stator teeth orientated radially about the longitudinal axis and extending axially in a first direction and a second stator portion having a plurality of second stator teeth orientated radially about the longitudinal axis and extending axially in a second direction opposite to the first direction;
the first stator portion and the second stator portion defining a first gap orientated about the longitudinal axis and extending axially between the first stator portion and the second stator portion and about the longitudinal axis;
at least a portion of the plurality of first stator teeth extending axially in the first direction beyond at least a portion of the plurality of second stator teeth that extend axially in the second direction, to form a second gap orientated about the longitudinal axis and extending both axially and radially between the plurality of first stator teeth of the first stator portion and the plurality of second stator teeth of the second stator portion and about the longitudinal axis;
first electromagnetic windings disposed in the first gap between the first stator portion and the second stator portion and configured to be selectively energized to exert a torque on the rotor assembly;
second electromagnetic windings disposed in the second gap between the plurality of first stator teeth of the first stator portion and the plurality of second stator teeth of the second stator portion of the first stator assembly and configured to be selectively energized to exert a torque on the rotor assembly; and
one of the first electromagnetic windings and the second electromagnetic windings extending radially inside of the other of the first electromagnetic windings and the second electromagnetic windings.

2. The claw-pole motor of claim 1, wherein the rotor assembly comprises a rotary shaft that is non-magnetic.

3. The claw-pole motor of claim 2, wherein the rotor assembly comprises a plurality of permanent magnets spaced about the longitudinal axis.

4. The claw-pole motor of claim 3, wherein the plurality of permanent magnets are attached to the rotary shaft.

5. The claw-pole motor of claim 3, wherein the total number of the plurality of first stator teeth of the first stator portion and the plurality of second stator teeth of the second stator portion are equal to the total number of the plurality of magnets of the rotor assembly.

6. The claw pole motor of claim 5, wherein the total number of the plurality of first stator teeth and the plurality of second stator teeth of the first stator assembly is forty.

7. The claw-pole motor of claim 3, wherein the first stator portion of the first stator assembly comprises a first outer body portion and a first extension portion and the second stator portion of the first stator assembly comprises a second outer body portion and a second extension portion.

8. The claw-pole motor of claim 7, wherein the first stator assembly and the rotor assembly comprise a magnetic flux path extending from a first magnet of the plurality of magnets across the radial air gap to a first stator tooth of the plurality of first stator teeth of the first stator portion of the first stator assembly.

9. The claw-pole motor of claim 8, wherein the magnetic flux path extends from the first stator tooth of the plurality of first stator teeth of the first stator portion through the first extension portion and the first outer body portion of the first stator portion to the second stator portion of the first stator assembly.

10. The claw-pole motor of claim 9, wherein the magnetic flux path extends from the first outer body portion of the first stator portion through the second outer body portion and the second extension portion to a second stator tooth of the plurality of second stator teeth of the second stator portion of the first stator assembly.

11. The claw-pole motor of claim 10, wherein the magnetic flux path extends from the second stator tooth of the plurality of second stator teeth of the second stator portion across the radial air gap to a second magnet of the plurality of magnets.

12. The claw-pole motor of claim 1, comprising a second stator assembly comprising third electromagnetic windings disposed in a gap in the second stator assembly and configured to be selectively energized to exert a torque on the rotor assembly, and fourth electromagnetic windings disposed in a gap between a plurality of stator teeth of the second stator assembly and configured to be selectively energized to exert a torque on the rotor assembly.

13. The claw-pole motor of claim 12, comprising a third stator assembly comprising fifth electromagnetic windings disposed in a gap in the third stator assembly and configured to be selectively energized to exert a torque on the rotor assembly, and sixth electromagnetic windings disposed in a gap between a plurality of stator teeth of the third stator assembly and configured to be selectively energized to exert a torque on the rotor assembly.

14. The claw-pole motor of claim 13, wherein the first stator assembly, the second stator assembly, and the third stator assembly are spaced axially along the longitudinal axis and are radially aligned relative to the longitudinal axis.

15. The claw-pole motor of claim 13, wherein an axial distance between the first stator assembly and the second stator assembly is greater than or equal to a radial distance of the radial air gap between the rotor assembly and the first stator assembly.

16. The claw-pole motor of claim 13, wherein the first stator assembly, the second stator assembly, and the third stator assembly are contained in a housing.

17. The claw-pole motor of claim 1, wherein the rotor assembly comprises a magnetic angular pitch and the first stator assembly comprises a stator teeth angular pitch, the magnetic angular pitch being equal to the stator teeth angular pitch.

18. The claw-pole motor of claim 1, wherein the first electromagnetic windings form an annular coil.

19. The claw-pole motor of claim 1, wherein the second electromagnetic windings are configured in an axial zig zag pattern about the longitudinal axis.

20. The claw-pole motor of claim 1, wherein the first stator teeth of the first portion alternate with the second stator teeth of the second portion about the longitudinal axis.

* * * * *